J. M. ALLEN.
VEHICLE WHEEL.
APPLICATION FILED AUG. 23, 1916. RENEWED OCT. 31, 1917.
1,262,903.
Patented Apr. 16, 1918.
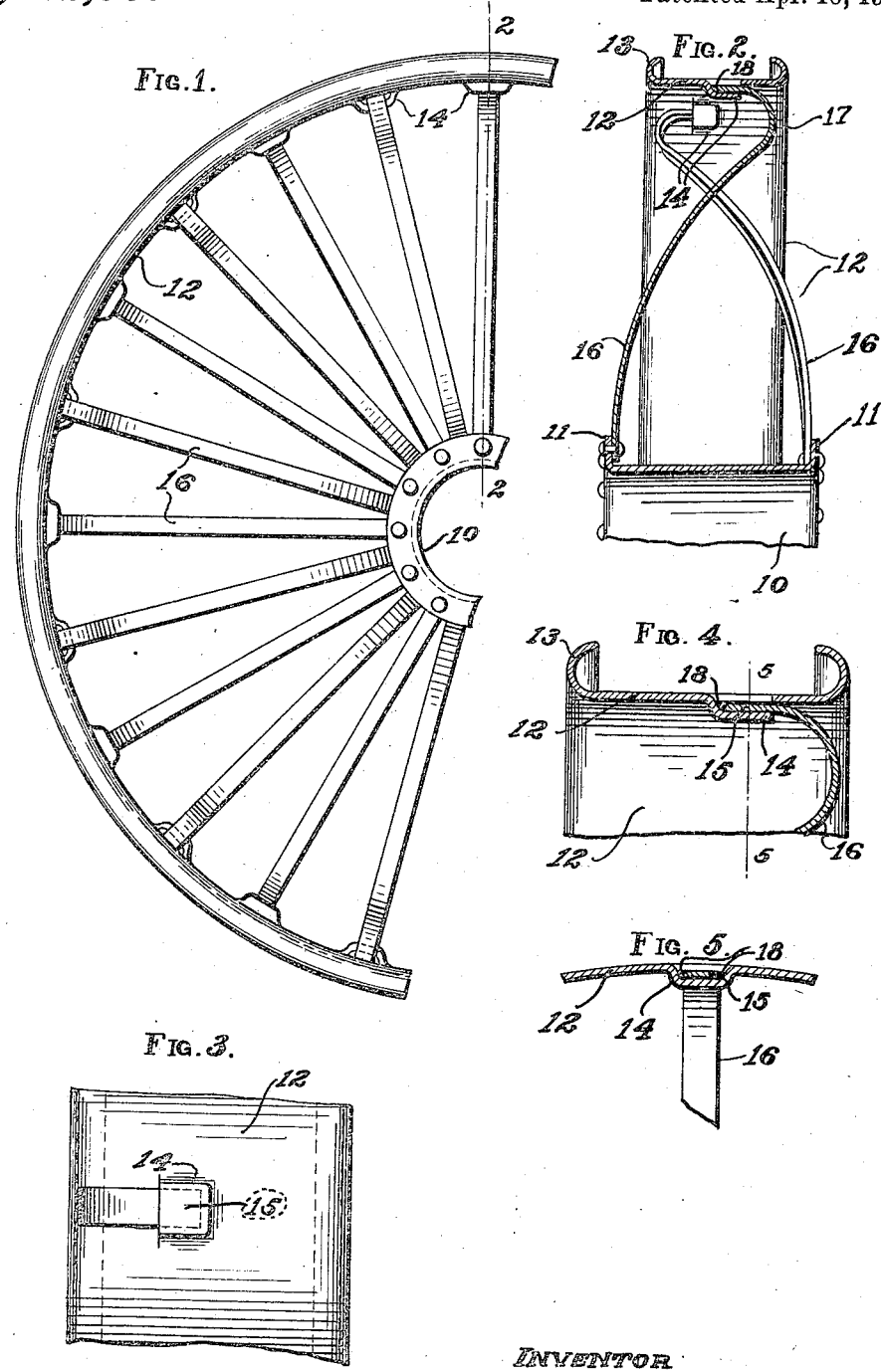
INVENTOR
James M. Allen

UNITED STATES PATENT OFFICE.

JAMES M. ALLEN, OF ST. LOUIS, MISSOURI, ASSIGNOR, BY DIRECT AND MESNE ASSIGNMENTS, TO FELLHAUER-ALLEN MANUFACTURING COMPANY, OF ST. LOUIS, MISSOURI, A CORPORATION OF MISSOURI.

VEHICLE-WHEEL.

1,262,903.

Specification of Letters Patent.

Patented Apr. 16, 1918.

Application filed August 23, 1916, Serial No. 116,452. Renewed October 31, 1917. Serial No. 199,614.

*To all whom it may concern:*

Be it known that I, JAMES M. ALLEN, a citizen of the United States, residing in St. Louis, State of Missouri, have invented certain new and useful Improvements in Vehicle-Wheels, of which the following is a specification.

My invention relates generally to vehicle wheels and more particularly to the metal spokes of the wheel and the particular means employed for connecting the outer ends of the spokes to the metal rim, the principal objects of my invention being to provide a comparatively simple, inexpensive vehicle wheel having metal spokes which while resilient have ample strength and rigidity to withstand all side strains or stresses which may be imparted to the rim portion of the wheel, and said spokes being connected to the rim firmly and securely without the use of rivets or like fastening devices.

My present invention is an improvement on the vehicle wheels disclosed in my co-pending applications filed February 25, 1916, Serial Number 80325 and April 8, 1916, Serial No. 89759, and it is one of the objects of my invention to improve upon the constructions forming the subject matter of said applications.

With the foregoing and other objects in view, my invention consists in certain novel features of construction and arrangement of parts hereinafter more fully described, claimed and illustrated in the accompanying drawings in which;

Figure 1 is an elevational view of a portion of a wheel of my improved construction.

Fig. 2 is a vertical section taken on the line 2—2 of Fig. 1.

Fig. 3 is a fragmental view looking against the inner face of the wheel rim and showing one of the spokes connected to said rim.

Fig. 4 is an enlarged cross-section through the rim and showing the end of one of the spokes connected thereto.

Fig. 5 is a vertical section taken on the line 5—5 of Fig. 4.

Referring by numerals to the accompanying drawings, 10 designates the hub of the wheel, the same being of any suitable construction, and provided with a pair of outwardly projecting flanges 11, the same being suitably spaced apart. The rim 12 is preferably constructed of suitable sheet metal with one or both edges flanged as designated by 13 in order to receive a suitable tire or a demountable rim which carries a tire. The rim thus formed is provided at suitable and preferably at regular distances apart with slits 14 the same lying parallel with the side edges of the rim and the material forming the rim to one side of each slit is pressed inwardly to form a recess or pocket 15. By virtue of the slits 14 these pockets 15 are each open at one end, and the material to the side of each slit is bent or pressed so that said pockets are alternately arranged, consequently the open end of one pocket is presented toward one side of the rim and the open end of the next adjacent pocket is presented toward the opposite side of the rim.

The spokes 16 forming a part of my improved wheel are formed of suitable strips of metal having a substantial degree of resiliency, and the inner ends of half of the spokes are secured in any suitable manner to one of the flanges 11 of the hub 10 while the ends of the other half of said spokes are secured to the other flange. The main body portions of the spokes are gradually curved so that their outer portions cross each other and the extreme outer ends are reversely bent with respect to the main body portions as designated by 17, and the extreme outer ends of all of the spokes which lie in a plane substantially at right angles to the plane occupied by the inner ends are seated in the pockets 15. The outer ends of the spokes thus disposed are fixed to the rim in any suitable manner preferably by brazing, and it is desirable that the material utilized for effecting the brazed joints be disposed so as to entirely fill that portion of each pocket which is not occupied by the end of the corresponding spoke.

By reason of the fact that the spokes are alternately arranged with respect to each other, the rim portion of the wheel is effectively reinforced and stiffened against laterally applied strains, and owing to the resiliency of the metal utilized in forming the spokes the entire wheel is yielding to a certain degree, thus minimizing vibration during service.

A wheel of my improved construction is comparatively simple, can be easily and cheaply manufactured, is resilient to a certain degree, and can be made in various sizes to suit different requirements.

It will be readily understood that minor changes in the size, form and construction of the various parts of my improved wheel can be made and substituted for those herein shown and described without departing from the spirit of my invention the scope of which is set forth in the appended claim.

I claim:

The hereindescribed wheel comprising a hub, a metal rim, portions of which are pressed inwardly to form transversely disposed pockets, each of which is open at one end only and with the open ends alternately disposed with respect to the sides of the rim and a series of spokes the same being formed of resilient metal strips set edgewise in a direction at right angles to the axis of the wheel and curved laterally with respect to the plane occupied by the body of the wheel, the inner ends of said spokes being fixed to the hub and the outer ends being seated in the pockets in the rim and rigidly fixed thereto.

In testimony whereof I hereunto affix my signature this 28th day of July, 1916.

JAMES M. ALLEN.

Copies of this patent may be obtained for five cents each, by addressing the "Commissioner of Patents, Washington, D. C."